United States Patent
Sudo et al.

[11] Patent Number: 5,110,621
[45] Date of Patent: May 5, 1992

[54] PROCESS FOR THE PRODUCTION OF MODIFIED POLYSILOXANE-COATED SANITARY RUBBER ARTICLE

[75] Inventors: Morihiro Sudo, Tokyo; Tomoyasu Muraki, Abiko; Eiji Kawachi, Kiryu; Yasushi Kawachi, Ashikaga, all of Japan

[73] Assignee: Daikyo Gomu Seiko Ltd., Tokyo, Japan

[21] Appl. No.: 577,698

[22] Filed: Sep. 5, 1990

Related U.S. Application Data

[62] Division of Ser. No. 209,639, Jun. 21, 1988.

[30] Foreign Application Priority Data

Jun. 23, 1987 [JP] Japan .................. 62-154272
Sep. 2, 1987 [JP] Japan .................. 62-218026

[51] Int. Cl.⁵ .............................. B05D 3/06
[52] U.S. Cl. .................. 427/44; 427/53.1; 427/54.1; 427/387; 427/393.5
[58] Field of Search ............ 427/53.1, 55, 54.1, 427/44, 387, 393.5

[56] References Cited

U.S. PATENT DOCUMENTS

| | | | |
|---|---|---|---|
| 3,962,519 | 6/1976 | Rüsch et al. | 428/447 X |
| 4,003,701 | 1/1977 | Brickman | 523/300 X |
| 4,017,670 | 4/1977 | Spicuzza et al. | 526/88 X |
| 4,316,941 | 2/1982 | Eguchi et al. | 428/421 |
| 4,818,576 | 4/1989 | Pennace et al. | 428/447 X |

FOREIGN PATENT DOCUMENTS

| | | | |
|---|---|---|---|
| 57-192403 | 11/1982 | Japan | 526/88 |
| 59-219303 | 12/1984 | Japan | 526/88 |

*Primary Examiner*—Bernard Pianalto
*Attorney, Agent, or Firm*—Wenderoth, Lind & Ponack

[57] ABSTRACT

A sanitary rubber article having an improved surface property to be useful as rubber parts of medical instruments or machines and as rubber articles for medicaments is provided. This sanitary rubber article is coated, through bridging and bonding, with a modified polysiloxane composition comprising a modified polysiloxane having at least one modifying group selected from the group consisting of alkenyl, acryloyl, vinyloxy, maleimide and phenylketone groups in the molecule.

8 Claims, 1 Drawing Sheet

PROCESS FOR THE PRODUCTION OF MODIFIED POLYSILOXANE-COATED SANITARY RUBBER ARTICLE

This application is a division of Ser. No. 07/209,639 filed Jun. 21, 1988.

BACKGROUND OF THE INVENTION

1. Field of the Invention

This invention relates to a sanitary rubber article whose surface property is improved by coating a surface of a rubber molded article with a modified organopolysiloxane composition through bridge formation and a process for the production of the same. The sanitary rubber article of the present invention is useful as rubber parts of medical instruments or machines and as rubber articles for medicaments.

2. Description of the Prior Art

Various methods have hitherto been proposed for the purpose of improving the surface property of a molded rubber material, for example, decreasing the surface friction resistance, imparting a solvent resistance, water repellence or ozone resistance, removing the adhesiveness, etc. For example, there have been proposed a process comprising holding a rubber article in chlorine or bromine gas or in a solution of sodium sulfonate (Japanese Patent Publication No. 3807/1982), a process comprising holding in a fluorine gas atmosphere (Japanese Patent Publication No. 19464/1983 and Japanese Patent Laid-Open Publication No. 218830/1984), a process comprising coating a rubber surface with an organopolysiloxane composition such as containing an organopolysiloxane having two or more hydroxyl groups bonded to silicon atoms in one molecule, polydiorganosiloxane with both terminal hydroxyl groups blocked, polyorganohydrogensiloxane, epoxy group-containing siloxane and amino-or alkoxy group-containing siloxane, followed by hardening (Japanese Patent Publication No. 47864/1981), a process comprising preparing a medical or sanitary rubber article by incorporating 0.1 to 10% by weight of an organo silicon compound capable of moving little by little in the rubber (Japanese Patent Publication No. 30089/1972), a process comprising coating the surface of a rubber molded article with a silcone raw rubber containing hydroxyl or methoxy groups in the molecule through bridge formation thereof (Japanese Patent Laid-Open Publication No. 96837/1982) and a process comprising producing a rubber stopper by coating and bridging a polydimethylsiloxane or a polydimethylsiloxane in which a part of the dimethyl groups is replaced by phenyl groups, vinyl groups, fluorine-containing groups, polyether groups, alkylallyl groups or fatty acid groups (Japanese Patent Laid-Open Publication No. 182418/1982). The inventors have also proposed a process comprising coating a rubber surface with a silane coupling agent containing amino groups as disclosed in Japanese Patent Laid-Open Publication No. 104672/1981.

In the case of producing sanitary rubber articles by the prior art as described above, however, there arise problems that the adhesive or adsorptive property remains or a medicament or food is contaminated with the coated polysiloxane composition which will enter the human body, and accordingly, these rubber articles can hardly be considered to be excellent.

Coating of the surface of a sanitary rubber article with a polysiloxane with a small thickness is a good method, but on the other hand, this method has disadvantages, for example, unevenness in coating thickness, foreign matters due to peeling of the coating, occurrence of fine particles, insufficiency of friction resistance, etc., and meets with problems, for example, on fitting to an instrument or machine. Furthermore, of late, it has eagerly been desired to develop a sanitary rubber article, for example, sanitary rubber stopper which can easily be handled in automatic operations.

SUMMARY OF THE INVENTION

It is an object of the present invention to provide a sanitary rubber article with improved surface properties.

It is another object of the present invention to provide a sanitary rubber article or rubber stopper with such a coating having excellent adhesiveness to a rubber surface that there is little occurrence of peeled fragments and sanitary problems and with such a coating having excellent heat resistance as well as lubricity that it can readily be fitted to instruments or machines and it can accommodate automation.

It is a further object of the present invention to provide a process for producing a sanitary rubber article with improved surface properties.

These objects can be attained by a sanitary rubber article the rubber surface of which is coated, through bridging and bonding, with a modified polysiloxane composition comprising a modified polysiloxane having one or more groups selected from the group consisting of alkenyl, acryloyl, vinyloxy, maleimide and phenylketone groups in the molecule.

BRIEF DESCRIPTION OF THE DRAWINGS

The accompanying drawings illustrate the principle and merits of the present invention in detail.

DETAILED DESCRIPTION OF THE INVENTION

Noticing that silicone oils, i.e. linear polysiloxanes show a lowest texture reaction in an organism, inactivity, very low toxicity, friction coefficient of 0.23 to 0.3 (25° C.) corresponding to a good lubricity although not amounting to that of spindle oil and moreover, an excellent heat resistance, the fundamental structure of polysiloxanes, linkage is held as it is so that these favourable properties can be maintained, and substituents are partly incorporated into the organopolysiloxane molecule to prepare a modified organopolysiloxane having an increased adhesiveness to a rubber surface to give a strong coating. Then, a modified polysiloxane composition containing this modified organopolysiloxane is applied to a rubber surface and bridged to form a coating strongly adhered to the rubber surface. The present invention is based on this concept.

Accordingly, the present invention provides a sanitary rubber product the rubber surface of which is coated, through bridging and bonding, with a modified polysiloxane composition comprising a modified polysiloxane having one or more groups selected from the group consisting of alkenyl, acryloyl, vinyloxy, maleimide and phenylketone groups in the molecule.

In the modified polysiloxane-coated sanitary rubber article according to the present invention, the modified polysiloxane has preferably a molecular weight of 2,000 to 5,000,000, in particular, 5,000 to 5,000,000 and the amount of the alkenyl group, acryloyl group, vinyloxy group, maleimide group or phenylketone group contained in one molecule of the modified organopolysiloxane is preferably in the range of 0.0001 to 5 mol %, in particular, 0.0001 to 2.5 mol %. Furthermore, the modified polysiloxane composition preferably contains an organopolysiloxane having in the molecule vinyl group, hydroxyl group, hydrogen atom, acetyl group, acetoxy group, epoxy group, ester group, ether group, alkenyl group, alkoxy group, amino group and/or mercapto group.

In addition, the present invention provides a process for the production of a modified polysiloxane-coated sanitary rubber article, which comprises applying to a rubber surface a modified polysiloxane composition comprising a modified polysiloxane having one or more groups selected from the group consisting of alkenyl group, acryloyl group, vinyloxy group, maleimide group and phenylketone group in the molecule and bridging the modified organopolysiloxane to form a coating strongly bonded to the rubber surface.

In the process for the production of a modified polysiloxane-coated sanitary rubber article according to the present invention, preferably an organopolysiloxane having a molecular weight of 2,000 to 5,000,000, in particular, 5,000 to 5,000,000 is applied with a solvent to a rubber surface, dried to remove the solvent and then subjected to a bridging and bonding treatment. As a means for bridging and bonding, it is preferable to effect irradiation of electron ray, ultraviolet ray or laser ray, or heating. As the organopolysiloxane in the above described process, there is preferably used a mixture or condensate of the above described modified organopolysiloxane and an organopolysiloxane having in the molecule vinyl group, hydroxyl group, hydrogen atom, acetyl group, acetoxy group, epoxy group, ester group, alkenyl group, alkoxy group, amino group and/or mercapto group.

Substituents to be incorporated into the molecule of an organopolysiloxane for obtaining the modified organopolysiloxane of the present invention are alkenyl group, acryloyl group, vinyloxy group (acryloyl group and vinyloxy group will sometimes be referred to as "acryloyl group"), maleimide group and phenylketone group.

Alkenyl group, acryloyl group, vinyloxy group, maleimide and phenylketone group are incorporated individually or in combination. Anyway, the sum of the incorporated groups is preferably 0.0001 to 2.5 mol % based on the modified organopolysiloxane molecule, since if the sum of the incorporated groups for modification exceeds 2.5 mol %, the polysiloxane will lack lubricity and will not be suitable for sanitary reasons, while if less than 0.0001 mol %, the bridging and bonding force to a shaped rubber surface is weak and accordingly, the modified polysiloxane is peeled off from the rubber surface, thus contaminating medicaments or the human body as a foreign matter.

The modified organopolysiloxane of the present invention can further contain a fluorine (F)-containing group such as 3,3,3-trifluoropropyl group, 4,4,4-trifluoro-3,3-difluorobutyl group or $(CF_3)_{1-3}$ group for the purpose of improving the lubricity of the polysiloxane.

In the present invention, the alkenyl group is vinyl, allyl or butenyl group. The acryloyl group includes non-substituted or substituted acryloyl groups and derivatives thereof, for example, acryloyl group ($CH_2=CH-CO-$), methacryl group ($CH_2=C \cdot CH_3-CO-$), alkylacryloyl group ($C_nH_{2n-1}-CH=CH-CO-$), hydroxymethylacryloyl group ($OH-CH_2-CH=CH-CO-$), methacryloxy group ($CH_2=C \cdot CH_3-CO_2-$) and methacryloxyalkyl group ($CH_2=C \cdot CH_3-CO_2-C_nH_{2n-1}-$). The vinyloxy group includes non-substituted or substituted vinyloxy group, for example, vinyloxy group ($CH_2=CH-O-$) and alkylvinyloxy groups ($RCH=CH-O-$).

These acryloyl and other groups can be bonded to the silicon atoms of the polysiloxane directly or through siloxane bonds.

For obtaining a modified organopolysiloxane having acryloyl groups, etc. in the molecule, known techniques can be applied, for example, an addition reaction of an acryloyl compound and polysiloxane compound or reaction with a metal halide removing salt (Japanese Patent Publication No. 35718/1977), an alcohol removal reaction, equilibration reaction, hydrolysis reaction, condensation reaction and acetic acid removal reaction (Japanese Patent Publication Nos. 35719/1977, 35720/1977 and 43560/1978), an addition reaction, substitution reaction, dehydration reaction and polymerization reaction (Japanese Patent Publication Nos. 2911/1978, 46650/1980, 36515/1978 and 46649/1980), etc., but reaction products obtained by the processes described in these publications as they are are high molecular weight polysiloxane solids lacking in lubricity and being sanitarily insufficient.

In the present invention, therefore, there can be provided a modified organopolysiloxane which can be applied to a rubber surface by utilizing the known techniques but by heating at a high temperature and reacting in the presence of a low toxicity catalyst such as iron salts or organic substances without necessity of a platinum type catalyst or tin type catalyst, or removing the platinum type or tin type catalyst, and which can then be bridged and bonded thereto to satisfy the surface lubricity and sanitary property. The details will be illustrated in the following examples.

As the maleimide group to be incorporated into a polysiloxane according to the present invention, it is preferable to use that formed by reaction of a maleic anhydride derivative of phenylmaleic acid, tolymaleic acid or α-phenyl-β-methylmaleic acid with an amine. This maleimide group can be bonded to the silicon atom of a polysiloxane directly or through an alkyl or aryl group such as ethyl, propyl or phenyl group, an alkylaminopropyl group such as ethylaminopropyl or propylaminopropyl group, diethyl ether group or diethylamine group. Synthesis of the polysiloxane into which such a maleimide group has been incorporated can be carried out through a reaction in a short time by applying known techniques, for example, disclosed in Japanese Patent Publication Nos. 5302/1978, 21199/1982 and 69229/1983.

In one preferred embodiment of the present invention, the modified organopolysiloxane containing alkenyl groups has the following general formula:

In this general formula, $R^1$ is a non-substituted or fluorine-substituted alkyl group having 1 to 7 carbon atoms such as methyl group or ethyl group, phenyl group or a phenylalkyl group. $R^2$ is an alkyl group having 1 to 4 carbon atoms such as methyl group, ethyl group, propyl group or butyl group. X represents at most five groups including one or more alkenyl groups such as vinyl group, allyl group and butenyl group as an essential group, the other groups being selected from the group consisting of hydrogen atom, hydroxyl group, epoxy group, acetoxy group, acetyl group, alkoxy groups having 1 to 3 carbon atoms and amino group, which groups are bonded to silicon atoms directly or through linear alkylene groups. The total number of the substituents X in the molecule is in the range of 1 to 40 and the sum thereof amounts to 0.001 to 5 mol %. With the increase of the quantity of X, the bridging and bonding force of a polysiloxane coating to the surface of a raw rubber body is increased, thus resulting in decrease of peeling of the polysiloxane coating, but if exceeding 5 mol %, the coating tends to show an increased water absorptivity, adsorptivity and toxicity and if less than 0.001 mol %, the bridging and bonding force is much decreased.

More preferably, as $R_1$ and $R_2$, fluorine-substituted and non-substituted alkyl groups having 1 to 4 carbon atoms and phenyl groups are bonded to silicon atoms directly or through alkylene groups and the quantity of the polysiloxane with this basic structure is at least 95 mol % in the polymer molecules. Furthermore, the silicon to carbon bonds should mainly be linear, since if cyclic branched or network structures are present in large amounts, the viscosity is too increased to uniformly coat a rubber surface.

The sum of phenyl groups in the polymer molecules is preferably at most 15 mol %, since if exceeding 15 mol %, the bonding force of the polysiloxane coating to a rubber surface and the sliding property thereof become inferior.

The modified polysiloxane of this embodiment has preferably a mean molecular weight of 2,000 to 5,000,000 and the degree of polymerization should preferably be in the range of $1 \leq n \leq 40$ and $20 \leq n + m \leq 70,000$ in the above described general formula, since if the degree of polymerization is less than 20, the modified polysiloxane tends to be evaporated and aged, which should be avoided, while if more than 70,000, the viscosity is too high to maintain a favorable compatibility with solvents and to form a uniform coating with a desired thickness.

Preparation of the modified polysiloxane of this embodiment can also be carried out by known techniques, for example, effecting in solvents hydrolysis, ester exchange, dehydration, substitution, condensation and polymerization reactions.

Thus, in this embodiment, a modified polysiloxane-coated sanitary rubber article can be produced by applying to the surface of a shaped rubber body a mixture of a modified polysiloxane composition comprising the above described modified polysiloxane with a volatile solvent, evaporating the solvent and then applying energy to the surface of the coating layer, thereby bridging and bonding the modified polysiloxane strongly thereto.

To the polysiloxane composition of the present invention can be added aromatic ketone compounds as a sensitizer and/or organoperoxide as a low temperature radical bridging agent for the purpose of effecting bridging and bonding at a low temperature in a short time. Furthermore, antioxidants and oiliness improving agents can also be added.

As the aromatic ketone compounds used as a sensitizer, there are given acetophenone type, benzoyl ether type and benzylketal type compounds, for example, acetophenone, propiophenone, 4,4'-bis(dimethylamino)benzophenone, 3- or 4-methylacetophenone, 3- or 4-pentylacetophenone, 4,4'-dimethoxybenzophenone, benzil, benzoyl isopropyl ether, benzoin ethyl ether, benzoin methyl ether, benzoin isobutyl ether, 2,2'-diethoxyacetophenone, 2-hydroxy-2-methylpropiophenone, 4'-isopropyl-2-hydroxy-2-methylpropiophenone, benzyl dimethyl ketal, 3,3'-dimethyl-4-ethoxybenzophenone, benzophenone, 2,5-dimethyl-2,5-di(3-methylbenzoylperoxy)hexane, tetramethyldisilylbenzophenone, both terminals benzoin etherized dimethylpolysiloxane, both terminals dibenzophenone etherized dimethyldisiloxane and 1-hydroxycyclohexyl phenyl ketone.

Activation with these compounds can be carried out by prior art techniques such as described in Japanese Patent Publication No. 1597/1975, Japanese Patent Laid-Open Publication No. 138081/1975 and "Light Radiation Hardening Technique" by Taiseisha Co., published 1985, page 267—.

These sensitizers are preferably added in small amounts, for example, in a proportion of 0.1 to 3% by weight to a polysiloxane and accordingly, they are preferably used in the form of a condensation product of a sensitizer and polysiloxane obtained by prior art techniques, e.g. described in Japanese Patent Laid-Open Publication Nos. 48854/1979, 207622/1982 and 131230/1982 and Japanese Patent Publication Nos. 48794/1976, 32913/1977 and 25679/1983. The details of this condensation reaction will be apparent from the following examples.

The organo peroxides used as a low temperature radical bridging agent are preferably organo peroxides capable of enhancing its effect by joint use with the aromatic ketone compounds, for example, 1,1-di(t-butylperoxy)-3,3,5-trimethylcyclohexane, t-butylcumyl peroxide, dicumyl peroxide, 2,5-dimethyl-2,5-di(t-butylperoxy)hexane, 2,5-dimethyl-2,5-di(t-butylperoxy)hexyne-3, t-butylperoxyisopropyl carbonate, benzoyl peroxide, di-t-butylperoxide, 2,2'-di-t-butylperoxybutane, diisobutyl peroxide, 3-benzoylperoxy-3-metylbutyltriethylsilane, tri-t-butyl pertrimellitic acid ester, 3,3',4,4'- tetra(t-butylperoxycarbonyl)benzophenone, di-t-butyl peroxide, t-butyl peroxybenzoate, 2,5-di(butylperoxy)2,5-dimethylhexane. These low temperature radical bridging agents are preferably added in a proportion of 0.01 to 3 parts by weight to 100 parts by weight of a modified polysiloxane.

In the case of using no sensitizer, nor bridging agent, it is preferable in order to satisfy the chemical and physical properties required for sanitary rubber articles as the objective product to use a modified polysiloxane containing a total amount of the substituents X bonded in the molecule of 0.2 to 5 mol %, preferably 1 to 5 mol %, more preferably about 5 mol %, or to increase the quantity of light energy irradiated.

For the modified polysiloxane composition containing acryloyl groups or maleimide groups according to the present invention, it is preferable to jointly use a light polymerization sensitizer or light initiator, which is capable of increasing the polymerization speed of the modified polysiloxane, conducting effective polymerization and thereby preventing the resulting rubber product from contamination with materials lowering the sanitary property thereof, i.e. non-condensation products, oligomers, etc.

In the present invention, the amount of the light initiator to be added is generally 0.01 to 10% by weight, preferably 0.1 to 5% by weight, more preferably 0.1 to 3% by weight to the polysiloxane containing acryloyl groups or maleimide groups, since if less than 0.01% by weight, the addition effects cannot be expected, while of more than 10% by weight, the tensile strength, elasticity and sanitary property are largely lowered.

The light initiator used in the present invention includes known light initiators such as acetophenone type, benzoyl ether type, benzyl ketal type and aromatic ketone type compounds, for example, acetophenone, p-t-butyltrichloroacetophenone, 2,2-diethoxyacetophenone, benzophenone, 4,4'-bisdimethylaminobenzophenone, 4-methyl-4'-trimethylsiloxydimethylsilylbenzophenone, p-methoxy-4'-trimethylsiloxydimethylsilylbenzophenone, 4-methoxy-4'-trimethylsilylbenzophenone, 4-dimethylamino-4'-dimethylvinylsilylbenzophenone, 4-methyl-4'-trimethylsilylbenzophenone, 4-trimethylsilylbenzophenone, 2,5-dimethyl-2,5-di(3-methylbenzoylperoxy)hexane, 3,3',4,4'-tetra(t-butylperoxycarbonyl)benzophenone, benzylbenzoin, benzoin methyl ether, benzoin-t-butyl ether, benzoin isobutyl ether, benzoin-terminated polydimethylsiloxane, benzyl dimethyl ketal, 1-hydroxycyclohexyl phenyl ketone, 2-hydroxy-2-dimethyl-1-phenylpropane-1-one, 1-(4-isopropylphenyl)-2-hydroxy-2-methylpropane-1-one, benzoyl peroxide and 2-chlorothioxanthone.

The modified polysiloxane composition comprising modified polysiloxanes containing one or more groups selected from the group consisting of acryloyl group (including vinyloxy group), maleimide group and phenylketone of light polymerization initiators according to the present invention can be blended with at least one of polysiloxanes into which known substituents are incorporated. Examples of the known substituents are hydrogen atom and hydroxyl, acetyl, acetoxy, alkoxy, ester, epoxy, vinyl, alkenyl, amino, methyl- or dimethylamino, mercapto, cyclohexanoylethyl, anilinopropyl, aminopropanyl, benzyl, cyclopropylmethoxypropyl, vinylmethylacetic acid groups and group of $-(CH_2)_3-O-CH_2-O-CH_2-$, and terminal blocking groups. Above all, the joint use of acryloyl group and/or maleimide group with hydrogen atom or vinyl group results in raising the light polymerization property and shortening the reaction through synergistic effect. Therefore, a modified polysiloxane composition having 1 to 20 mol % of hydrogen atoms and/or vinyl groups in the molecule can be used for the present invention. In the present invention, as a modified polysiloxane composition to be coated onto a rubber raw body, there is preferably used a polysiloxane having methyl, ethyl or phenyl groups, the sum of the methyl, ethyl and phenyl groups being preferably 25 to 80 mol % and the amount of the phenyl groups being preferably 15 mol % or less, and the said composition has preferably a viscosity of 10 to 10,000 and a molecular weight of 5,000 to 5,000,000. These limitations are desired for light bridging and coating.

In the present invention, as a rubber for composing a raw body of a rubber article, which surface is to be coated with the modified polysiloxane composition, there can for example be used diene type rubbers such as isoprene rubber (IR), butadiene rubber (BR) and styrene-butadiene rubber (SBR), butyl rubbers (IIR, BIIR, CIIR), olefinic rubbers such as ethylene-propylene rubbers and ethylene propylene terpolymer, thermoplastic elastomers and natural rubbers. These known rubbers are blended with conventional additives such as bridging agents, bridging activating agents and reinforcing agents and then heated, bridged and formed.

In the present invention, a modified polysiloxane composition is preferably diluted with a solvent and then coated onto the surface of a shaped rubber. As this solvent, there can for example be used n-hexane, gasoline, toluene, benzene, isopropyl alcohol, methyl ethyl ketone, 1,1,1-trichloroethylene, trichloroethylene, methanol, ethanol, acetone, methyl isobutyl ketone, tetrahydrofuran, trichlorofluoroethane, diethyl ketone, isopropyl ketone, 1,1,1-trifluoroethane, trichloromonofluoromethane, dichlorodifluoromethane and the like, individually or in combination. Particularly, solvents are preferable having a boiling point of lower than 100° C., low toxicity and low price.

Preferably, the modified polysiloxane composition is coated under such a state as having a fluidity with a viscosity of less than 30,000. Uniform coating onto the surface of a shaped rubber can be obtained by applying a diluted solution of the polysiloxane in a solvent with a concentration of 0.001 to 5% by weight, preferably 0.01 to 3% by weight to give a coating thickness of 0.1 to 50 μm.

Coating of a solution of a modified polysiloxane composition onto a rubber surface can be carried out by any method of spraying, brush painting and immersing in the solution in a short time, and of course, other suitable methods for applying the solution to a rubber surface can be employed. Then, the coating is dried at a relatively low temperature, e.g. 80° C. or lower and bridged to strongly bond the modified organopolysiloxane composition to the rubber surface so as to give a coating thickness of preferably 0.1 to 30 μm.

As a method of bridging and bonding a modified polysiloxane composition to a rubber surface, it is preferable to carry out a treatment by heat or light energy, in particular, an irradiation treatment utilizing a light energy in a short time, e.g. about 2 minutes or less, whereby to obtain a high bonding strength of the modified polysiloxane composition. Ultraviolet rays, electron beam and laser beam (YAG laser beam wavelength 10.6μ) are generally used as the light energy, but in view of the installation cost, it is desirable to use a low voltage, high voltage or ultra-high voltage mercury lamp, discharge tube of argon, neon, hydrogen or nitrogen, xenon lamp or xenon-mercury lamp because of its simplicity. When using a quartz glass tube in which mercury and argon gases are enclosed and which emits ultraviolet rays of 220 to 400 nm round 360 nm, visible rays of 400 to 800 nm and infrared rays of 800 nm or longer (heat rays) with an ultraviolet rays generating efficiency of at most 10%, for example, the modified polysiloxane composition can be bridged and bonded to a rubber surface in 2 to 60 seconds. As described above, the irradiation of ultraviolet rays is most economical and favorable because it can be done with a small installation by a treatment in a short time.

In the case of the heat energy, on the other hand, heating is generally carried out by radiation heat using air as a medium at a temperature of at least 100° C., which has commonly been employed for heating a rubber shaped body of this kind, but this method needs a longer time than the method of light irradiation, thus resulting in a fear of oxidation or deterioration of a rubber surface layer. Thus, it is considered possible to employ a method comprising adding a reaction catalyst or radical producing agent to a modified polysiloxane composition and heating at a low temperature, thereby bridging and bonding, but this method is not suitable for giving a sanitary rubber article since such additives sometimes have a coloring or toxic property.

The surface of a sanitary rubber article according to the present invention has both rubber elasticity and plasticity obtained through bridging and bonding of a modified polysiloxane composition, and is different from metals and plastics. A rubber raw body, used as a starting material of a sanitary rubber article according to the present invention, has generally a surface friction coefficient of 1 to 4 or more, but this friction coefficient can be reduced to 1/10 1/50 by forming a modified polysiloxane coating, which moreover can stably be maintained for a long period of time.

The sanitary rubber article of the present invention has a coating with an improved and increased bonding strength or adhesiveness to rubbers because of bridging and bonding a modified polysiloxane composition coated onto the surface of a rubber raw body and has thus such a higher sanitary property as being non toxic, excellent in sliding property, free from peeling-off of the modified polysiloxane, easy to handle and passing the standard of a medical rubber stopper according to 11th Revision, Japanese Pharmacopoeia. Therefore, the rubber article of the present invention can be used as a medical rubber stopper for a powdered preparation, freeze-dried medicament or liquid injection medicament, a slidable stopper for an injector, a rubber stopper for a medical instrument such as artificial kidney instruments and other artificial internal organs instruments, and a sealing material. For example, a sliding stopper for an injector according to the present invention has such a good sliding property that it can readily be moved in a cylinder and is free from peeling-off and occurrence of fine particles. A rubber stopper of the present invention is also useful in view of less occurrence of fine particles when applied to injection medicaments and easy operation of automatic closing of a medical vial for freeze-dried preparation. Furthermore, production of the sanitary rubber article of the present invention can be carried out with a higher efficiency and lower production cost, since the step of bridging and bonding a modified polysiloxane is accomplished in seconds unit by a simple apparatus.

The following examples are given in order to illustrate the present invention in detail without limiting the same, in which parts and percents are to be taken as those by weight unless otherwise indicated.

EXAMPLES

Examples of modified organopolysiloxanes used in the present invention and synthesis methods thereof will now be illustrated:

A. Polysiloxanes containing acrylate groups (A-1 to A-17)

A-1) 53 g of linear hydoxydimethylpolysiloxane (polymerization degree of siloxane linkage n=700, mean molecular weight=53,000) and 0.3 g of 3-methacryloxypropyltrimethoxysilane were charged in a reactor equipped with a stirrer and cooler means and heated at 80° C. while stirring by feeding nitrogen gas and removing the resulting methanol by an ester adapter equipped with a cooling means, thus obtaining 52 g of a product with a viscosity of 13 cs (25° C.) and the following chemical structure. For the present invention, this product is used as an isopropyl alcohol solution (11.5%).

A-2) 110 g of linear dimethylpolysiloxane (n≈1500, hydroxyl group=about 1 in one molecule), 0.2 g of γ-methacryloxypropyltrihydroxysilane, 100 g of xylene and 0.1 g of o-titanic acid isopropyl ester were charged in a reactor and heated and stirred at about 130° C. for 10 hours, while the resulting water was removed. The product was washed with warm water to obtain a viscous product with the following chemical structure. For the present invention, this product was used in the form of a 11% solution in a mixed solvent of toluene and benzene (5:3).

A-3) 59 g of diethoxy-methyl-γ-trifluoropropylpolysiloxane (mean molecular weight 54,000), 1.6 g of diethyl glycol monoacrylate and 0.1 g of potassium acetate were charged in a reactor and heated at 110° C. while stirring and removing the resulting ethanol out of the system by feeding nitrogen gas. The product was washed with warm water to give 61 g of a light-yellow and clear liquid product having the following chemical structure (acrylic group 0.1 mol %). For the present invention, this product was used in the form of an about 11% solution in a mixed solvent of toluene and isopropyl alcohol (1:1).

A-4) 25 g of water, 5 g of toluene and 0.5 g of isopropyl alcohol were charged in a reactor and maintained at a temperature of 5° to 8° C., to which mixed silanes of 1.3 g of dimethyldichlorosilane, 1.1 g of monophenyltrichlorosilane and 5.2 g of γ-methacryloxypropyltrichlorosilane were dropwise added for 1 hour, followed by stirring for 30 minutes. Then, 553 g of dichloro-γ-trifluoropropylmethylpolysiloxane (mean molecular weight 50,000), 8 g of pyridine and 10 g of tetrahydrofuran were added thereto and heated and stirred at 80°-85° C. for 4 hours, after which pyridine hydrochloride was removed, followed by washing with water, tetrahydrofuran was then removed by vacuum distillation and the product was washed with warm water, thus obtaining 510 g of a viscous product having the following chemical structure (methacryloyl groups 0.12 mol %). For the present invention, this product was used in the form of a 10.0% solution in isopropyl alcohol as a solvent.

A-5) To a solution of 223 g of α-ω-dihydroxypolydimethylsiloxane and 0.8 g of pyridine dissolved in 400 ml of diethyl ether was dropwise added gradually a 10% diethyl ether solution of 0.4 g (0.0015 mol) of γ-methacryloxypropyldimethylchlorosilane at room temperature for 20 minutes. The mixture was further stirred for 1 hour and after the reaction, white crystal of pyridine hydrochloride was filtered and shaked and washed with 500 ml of water, thus obtaining 205 g of a colorless and clear acryl modified polysilicone (acryl groups 0.05 mol %). For the actual use, an about 20% solution of this product in isopropyl alcohol as a solvent was prepared.

A-6) To 200 g of methylphenylhydrogenpolysiloxane polymer (Si-H groups 0.07 mol %, CH$_3$ group 47.5 mol %, molecular weight about 40,000) and 1.2 g of γ-methacryloxypropyltrimethylsilane were added 7.6 g of methylphenylvinylpolysiloxane polymer (vinyl groups 0.01 mol % in one molecule, molecular weight about 10,000) and 300 g of trichlorotrifluoroethane and the mixture was stirred to be homogeneous for 1 hour, thus obtaining a 11.5% solution of the polysiloxane containing 0.1 mol % of methacrylate.

A-7) 25 g of methylhydrogenpolysiloxane with a viscosity of 20 cps, 30 g of sym-tetramethyltetravinylcyclotetrasiloxane, 445 g of octamethylcyclotetrasiloxane and 5 g of acid clay (catalyst) were subjected to condensation at 85° C. for 20 hours while stirring by flowing nitrogen gas. To the reaction product were added 1 g of methacrylatepropylmethyldichlorosiloxane and 0.05 g of di-t-butyl-4-methylphenol and the mixture was reacted at 85° C. for 5 hours, to which 1.5 g of water was then added, followed by stirring at 30°-35° C. for 30 minutes. The reaction product was washed three times with a 5% aqueous solution of NaHCO$_3$ to obtain 12 g of a compound having the following chemical structure (methacryl groups 0.14 mol %). For the present invention, this compound was used in the form of an about 12% solution in isopropyl alcohol.

n=about 20, m=about 1500, o=about 10, molecular weight=113,400

A-8) 0.2 g of methacryloxypropyltrimethylsilane, 100 g of a polysiloxane (o=about 500) having the following chemical structure, 1.5 g of methylhydroxy-terminated polysiloxane (Si-H groups 1.0%), 0.2% of chloroplatinic acid and 0.02 g of isopropyl alcohol were mixed and stirred at normal temperature for about 2 hours, to which 780 g of isopropyl alcohol was then added to form a uniform mixed solution (methacryl groups 0.1 mol %). This mixed solution can be coated onto a rubber surface as it is.

A-9) Polysiloxanes were mixed according to the following composition:

| | |
|---|---|
| γ-methacryloxypropyltrimethoxysilane | 0.2 g |

This polysiloxane mixture was mixed with 0.1 g of a 0.1% solution of chloroplatinic acid in isopropyl alcohol with agitation, reacted at 30° C. for 1 hour and after raising the temperature to 80° C., the mixture was stirred for 3 hours to obtain a viscous product, which was then washed with warm water adequately. This viscous product was used in the form of an about 11% solution (methacryl groups 0.1 mol %) in isopropyl alcohol as a solvent.

A-10) A mixture of 170 g a toluene solution containing 70% of a polysiloxane (OH groups 0.5%, $CH_3/C_6H_5=4$), 1.5 g of N-(2-aminoethyl)-3-aminopropyltrimethoxysilane, 87 g of toluene and 0.1 g of sodium hydroxide was heated at 90° C. for 3 hours and about 4.5 g of the resultant methanol was removed. Then, 2.6 g of glycidyl methacrylate was added thereto and heated at 70° C. for 3 hours to obtain a solution of acryloyloxy group-containing organopolysiloxane (acrylate groups in polysiloxane 2.1 mol %) represented by the following chemical structure through the addition reaction of amino group and epoxy group, followed by adequately washing with water to be neutral.

A-11) 100 g of a dimethylpolysiloxane having dimethyl group and vinylsilyl group at the terminals (n=100, viscosity 10,000 cps), 10 g of dimethylmethylhydrogensiloxane (trimethylsiloxane unit 10 mol %, dimethylsiloxane 70 mol % and hydrogensiloxane unit 20 mol %, n=15), 2 g of γ-methacryloxypropyltrimethoxysilane and 0.01 g of a 0.1% ethanol solution of chloroplatinic acid were mixed, heated and stirred at about 80° C. for 1 hour. The resulting mixture was mixed with 5 g of benzoyl peroxide and 800 g of ethanol and then used for the surface of a rubber article.

A-12) 53 g of dimethylpolysiloxane having 1,1,3,5,5,7,7-heptamethyltetrahexane at both the terminals (n=700) was mixed with 0.2 ml of a 0.1% ethanol solution of chloroplatinic acid, to which 2 g of γ-methacryloxypropyltriethylsilane was dropwise added for 10 minutes with agitation, and after the dropwise addition, the mixture was gradually heated to 110° C. At that temperature, the mixture was further stirred for 1 hour and reacted and volatile substances were removed under reduced pressure. To 2.5 g of the product were added 50 g of polydimethylsiloxane (viscosity 10 cps), 1 g of polyorganohydrogensiloxane (viscosity 20 cps) and 10 ppm of chloroplatinic acid octene complex salt as a solution, and the resulting reaction mixture was dissolved in a 1:1 solution of isopropyl alcohol and toluene to prepare a 10% solution.

A-13) 191 g of α-ω-dihydroxydimethylpolysiloxane (hydroxyl groups 0.23%, n=4,000, viscosity 100 cps), This polysiloxane was actually used in the form of a 12.5% solution in isopropyl alcohol as a solvent.

4.6 g of γ-methacryloxysilane and 0.1 g of tetraisopropyl titanate were mixed and reacted at 20° C. for 10 minutes while stirring, after which the mixture was heated to 150° C. for 30 minutes, and methanol generated during the same time was collected by a collector. The thus resulting product was washed with warm water, thus obtaining polysiloxane (methacryl groups 1 mol %, viscosity 1000 cps). This product was mixed with isopropyl alcohol as a solvent to give an about 15% solution to be applied to the surface of a rubber article.

A-14) To a mixed liquid (liquid A) consisting of 100 g of polydimethylsiloxane having dimethylvinylsilyl groups at both the terminals (molecular weight, 7,400, viscosity 3,000 cps), 5 g of organopolysiloxane ((CH$_3$)$_3$SiO$_{\frac{1}{2}}$: 45 mol %, SiO$_2$: 50 mol %, CH$_2$=CH(CH$_3$)SiO: 5 mol %), 2 g of polymethylhydrogensiloxane having trimethylsilyl groups at both the terminals (viscosity 20 cps) and 2 g of a 0.1% hexanol solution of chloroplatinic acid was added a mixed liquid of 0.2 g of 3-methacryloxypropyltriacetoxysilane and 0.5 g of hexanol at 40° C. for 24 hours while stirring. This mixed composition had a methacrylate content of 0.1 mol %. The resulting reaction liquid was mixed with petroleum ether as a solvent as it was and used for the surface of a rubber article in the form of a 13.2% solution.

A-15) A mixed liquid of 0.2 g of γ-methacryloxypropyltrimethoxysilane and 0.5 g of hexanol was added to the liquid A of the above described A-14) and stirred at 40° C. for 24 hours. Thie mixed reaction liquid was mixed with petroleum ether as a solvent as it was to prepare a 13.2% solution to be sprayed on the surface of a rubber article.

A-16) 110 g of linear dimethylsiloxane (polymerization degree of siloxane linkages n=150, hydroxyl groups 30), 22.5 g of γ-methacryloxypropyltrihydroxysilane, 100 g of xylene and 1 g of isopropyl orthotitanate were charged in a three-necked flask, heated with agitation at about 130° C. for 4 hours and further heated at 130° C. for 10 hours while removing water as a by-product, thus obtaining a product represented by the following chemical structure (methacryl content 5.4 mol %):

dropwise added for 1 hour, and the mixture was further heated to 20° C. and stirred for 30 minutes. The reaction mixture was washed with water to be neutral and then concentrated under reduced pressure to give a siloxane concentration of about 50%, to which 800 g of α-ω-dihydroxytrifluoropropylmethylpolysiloxane (molecular weight 1,600), 1 g of p-toluenesulfonic acid and 0.2 g of metol were then added, followed by stirring at a temperature of 110° C. for 8 hours to distil off ethanol from a distilling column. After the reaction, the reaction product was neutralized with 10 g of Na$_2$CO$_3$ powder at about 80° C. and filtered as sodium salt of the sulfonic acid. The thus resulting condensate was used in the form of a 12% toluene solution (methacryloxy content 3 mol %).

B. Polysiloxanes containing maleimide groups (B-1 to B-3)

B-1) 50 g (0.3 mol) of N-propyl-2,3-dimethylmaleimide and 0.8 ml of a 0.05% isopropyl alcohol solution of chloroplatinic acid were mixed, to which 20.2 g (0.15 mol) of tetramethyldicyclohexane was dropwise added at 60° C. in nitrogen gas atmosphere, and after the dropwise addition, the mixture was heated to 140° C. and then cooled, followed by maintaining the mixture at 110° C. for 1 hour. The resulting oily product could be subjected to distillation in high vacuum, but as it was, a mixture consisting of 1.8 kg of octamethylcyclotetrasiloxane, 1700 ml of dimethoxyethane and 100 g of concentrated sulfuric acid was added thereto and reacted while stirring for 24 hours. The resulting viscous product was diluted with 300 ml of ethyl ether, washed with water to be neutral and dried using anhydrous sodium sulfate, thus obtaining an organopolysiloxane represented by the following chemical structural formula (mean molecular weight 3800-4200). This modified polysiloxane was mixed with a mixed liquid of toluene and isopropyl alcohol (1:1) as a solvent to prepare an about 13% solution to be applied to the surface of a rubber article.

This product was mixed with a mixture of toluene and isopropyl alcohol (1:1) to prepare a 12% solution to be applied.

A-17) 2.5 l of water, 0.5 l of toluene and 50 g of isopropyl alcohol were charged in a four-necked flask and stirred at a temperature of 5° to 10° C., to which a mixture consisting of 5 g of monomethyltrichlorosilane, 75 g of dimethyldichlorosilane, 126 g of diphenyldichlorosilane, 105 g of monophenyltrichlorosilane and 131 g of 3-methacryloxypropyltrichlorosilane was

B-2) 200 g of an organopolysiloxane having 3-aminopropyl groups at both the terminals (n=160-220) was dissolved in 200 g of toluene, to which a solution of 1.7 g of phenylmaleic anhydride dissolved in 25 ml of tetrahydrofuran was dropwise added at 20° C., and the mixture was reacted at 25° C. for 1 hour and further reacted at 100° to 110° C. for 4 hours, followed by washing the viscous product with water, thus obtaining an organopolysiloxane containing maleimide groups, represented by the following chemical structural formula. This modified polysiloxane was used for the surface of a rubber article in the form of a 9% isopropyl solution.

n = 1,000–3,000

B-3) 247 g of a 15% toluene solution of dimethylpolysiloxane having hydroxy group at one end of the molecular chain (n=500), 208 g of a 15% toluene solution of a hydrolyzate of phenyltrichlorosilane and 8 g of a 5% toluene solution of organopolysiloxane containing phenylmaleimide groups were mixed, to which 0.3 g of zinc octylate was then added, and the resulting mixture was reacted for 8 hours with refluxing the toluene, thus obtaining 34 g of a modified polysiloxane represented by the following chemical structural formula. This product was sprayed on a rubber article as it was solution.

represented by the following chemical structural formula,

C. Polysiloxanes containing phenylketone groups (C-1 to C-5)

C-1) A Gringnard reagent consisting of 0.2 mol of 4-trimethylsilylchlorobenzene and 0.2 mol of magnesium was prepared in tetrahydrofuran, mixed with 0.2 mol of 4-methylbenzaldehyde and subjected to Oppenauer oxidation reaction to obtain 4-methyl-4'-trimethylsilylbenzophenone represented by the following chemical structural formula:

The reaction product was actually used in the form of a 15% solution in isopropyl alcohol.

C-2) 47 g (0.22 mol) of benzoin, 28 g (0.26 mol) of triethylamine and 100 ml of toluene were charged in a reaction vessel, to which 133 g (0.1 mol) of α-ω-dichlorodimethylpolysiloxane was dropwise added while stirring, and the mixture was reacted. The temperature rised, but the reaction was carried out by maintaining at 60° C. or lower and after the dropwise addition, the mixture was stirred at 60° C. for 60 minutes. The resulting triethylamine hydrochloride was separated by filtration and the toluene was distilled off to thus obtain 131 g of dimethylpolysiloxane having benzoin groups at both the terminals (viscosity 60 cps),

This product was dissolved in 800 g of isopropyl alcohol to prepare an about 14% solution to be applied to a rubber article.

C-3) 4-Methoxy-4'-trimethylsiloxydimethylsilylbenzophenone represented by the following chemical structural formula, was dissolved in isopropyl alcohol as a solvent to prepare a 13% solution to be applied to a rubber article.

C-4) 2 g of 4-allyloxybenzophenone and 2 g of tetramethyltetrahydrogencyclotetrasiloxane were heated at 80° C., to which 0.01 g of a 1% tetrahydrofuran (THF) solution of chloroplatinic acid was dropwise added with agitation. After stirring the mixture for 1 hour as it was, 1 g of hexamethyldisiloxane, 37 g of octamethylcyclotetrasiloxane and 0.01 g of trifluoromethanesulfonic acid as a catalyst for the copolymerization were added thereto and the above described compounds were stirred and copolymerized at 80° C. for 5 hours. The reaction liquid was then neutralized with a 50% aqueous solution of sodium carbonate and washed with warm water to obtain 40 g of a product represented by the following chemical structural formula:

This product was added to isopropyl alcohol to prepare an about 12% solution to be applied to a rubber article.

C-5) 2.5 g of α-allyl-α-hydroxy-2-phenylacetophenone and 1.1 g of dimethyldimethoxysilane were mixed and heated at 60° C., to which 0.01 g of a 1% tetrahydrofuran solution of chloroplatinic acid was added with agitation. After gradual rising of the temperature and reaction at 90° to 100° C. for 1 hour, 5 g of a linear polydimethylsiloxane having hydroxyl groups at both the terminals, a part of which was blocked with trimethylsilyl groups (($CH_3$)$_3$Si content 2%), 50 g of toluene and 0.01 g of a 10% ethanol solution of KOH were added and heated, and the resultant alcohol and water were removed. Then, the reaction liquid was neutralized with trimethylchlorosilane and the solvent was distilled off under reduced pressure, thus obtaining 40 g of a photosensitized polysiloxane with a viscosity of 250 cps. 0.5 g of this product was mixed with a mixture of 5 g of a dimethylvinylsiloxy terminal blocked polysiloxane consisting of about 90 mol % of dimethylsiloxane units and 10 mol % of methylvinylsiloxy units and 0.4 g of a trimethylsiloxy terminal-blocked polysiloxane consisting of methylhydrogensiloxy units and completely dissolved to be homogeneous. 360 g of isopropyl alcohol was added to the above described photosensitized polysiloxane to prepare a solution to be applied to a rubber article.

C-6) 100 g of a linear dimethylpolysiloxane having ethoxy groups at both the ends (n=15), 30 g of p-hydroxybenzophenone, 200 g of xylene as a solvent and 2 g of trifluoroacetic anhydride were charged in a four-necked flask equipped with a refluxing condenser, heated at 130° to 135° C. for 4 hours with agitation to evaporate and remove the resulting ethyl alcohol, to which $Na_2CO_3$ was added, heated and neutralized, followed by filtering and distilling xylene under reduced pressure. Thus, a polysiloxane having the following chemical structural formula was obtained:

D Polysiloxanes having vinyloxy groups (D-1)

D-1) The following materials were reacted to obtain a polysiloxane having vinyloxy groups:

89.0 g of dimethylpolysiloxane (both terminals OH groups blocked, viscosity 20,000), 10.7 g of dimethylpolysiloxane (both terminals trimethylsilyl groups blocked, viscosity 100 cps), 8 g of methyltrisbutanoxysilane, 0.5 g of γ-aminopropyltriethoxysilane, 0.3 g of a compound represented by the following structural formula, and 700 g of a mixed liquid of toluene and isopropyl alcohol. The resulting polysiloxane composition contained 0.004% by weight of vinyloxy groups.

EXAMPLES 1 TO 28 AND COMPARATIVE EXAMPLES 1 TO 12

Formation of Rubber Raw Body and Coating

| Rubber Compound | parts |
| --- | --- |
| IIR (JSR Butyl 365 -commercial name- made by Japan Butyl Co., degree of unsaturation 2.0 mol %, Mooney Viscosity $ML_{1+8}$ 100° C. 44 ± 1) | 100 |
| Active Zinc Oxide (made by Bayer AG) | 3 |
| Stearic Acid | 1 |
| Calcined Clay (Burgess Iceberg -commercial name- made by Burgess Pigments Co.) | 60 |
| Processing Aid (powdered polyethylene, made by Seitetsu Kagaku Co.) | 1.2 |
| Magnesium Oxide (made by Kyowa Chemical Industry Co.) | 5 |
| White Carbon (Carplex 1120 -commercial name- made by Shinogi Seiyaku Co.) | 10 |
| Titanium Oxide (made by Ishihara Sangyo Co.) | 3 |
| Finely Powdered Sulfur (Hosai Kagaku Co.) | 0.7 |
| Zinc Di-n-butyldithiocarbamate | 1.0 |
| Zinc Diethyldithiocarbamate | 0.6 |

The above described rubber composition was kneaded using two rolls and an internal mixer according to a test method of the standard of The Society of Japan Rubber Industry 3603 (1979). Using the thus resulting rubber compound, 225 rubber stoppers with a shape as shown in FIG. 1 were produced by subjecting it to heating and pressing between a lower metal mold having a recess with a shape corresponding to a leg part 2 of a rubber stopper 1 as shown in FIG. 1 and an upper metal mold having a recess with a shape corresponding to a cap part 3 of the rubber stopper 1 at a temperature of 160° C. and a pressure of 50 to 60 kg/cm² for 20 minutes, and thereby bridging and shaping.

Figure 2:
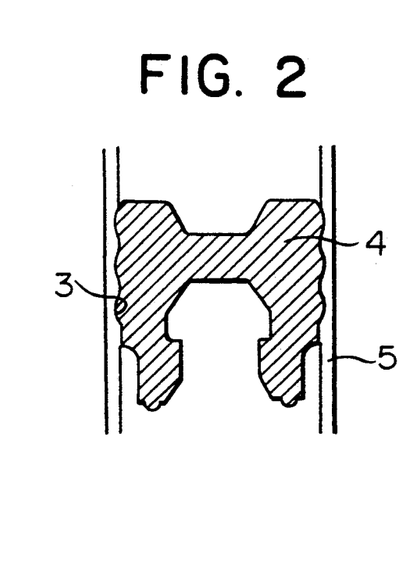
FIG. 2 is a cross-sectional view of another embodiment of a sealing and sliding rubber stopper for an injector according to the present invention.

A sliding stopper or plug for an injector, as shown in FIG. 2, was molded by the similar steps.

Figure 1:
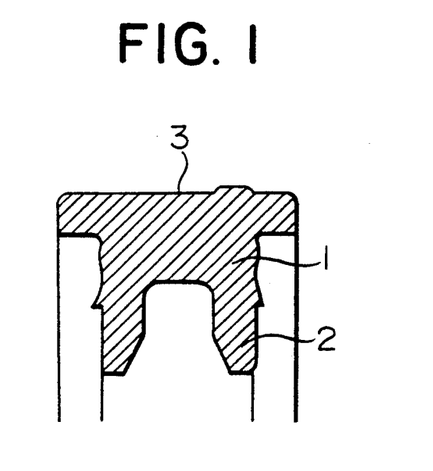
FIG. 1 is a cross-sectional view of one embodiment of a medical rubber stopper (rubber stopper for lyophilized medication) according to the present invention.

In the case of the molded rubber stopper, the solutions of the various modified polysiloxane compositions described in the foregoing A, B, C and D were further diluted with the same solvents by ten times and the diluted solutions were sprayed on the leg part of the rubber stopper shown in FIG. 1 two times and on the surface of the cap part one time, followed by allowing to stand at a temperature of 40° to 60° C. for 1 to 5 hours and evaporating the solvents to obtain modified polysiloxane coatings with a thickness of 0.1 to 5 μm.

In the case of the sliding stopper for an injector shown in FIG. 2, it was immersed in the same diluted solutions as in the case of the rubber stopper for 1 second and then dried, followed by bridging in the similar manner to the rubber stopper.

Bridging and Bonding

The bridging and bonding were carried out by two methods, i.e. a method comprising heating in hot air at about 90° C. for 3 to 5 hours (Example 10) and a light bridging method comprising irradiating light in a short time as shown in Tables 1 and 2 by a distance of 8 to 10 cm using a high voltage mercury lamp (H-type, output 400 W) (other Examples).

Test for Estimation of Properties

Quantity of Polysiloxane Peeled Off:

10 rubber stoppers were charged in a 500 ml wide-mouthed bottle to which 300 ml of fine particle-free water was then added and the bottle was shaked manually for 60 seconds and allowed to stand for 60 minutes as it was. The resulting liquid was then subjected to measurement of the turbidity in the water by flowing it at a constant flow rate of 8 ml/min to count the number of particles of 5 to 7 $\mu$m in diameter using HIAC/-Royco Automatic Particle Counter, the measured turbidity being referred to as "peeling quantity". The average values of the three measurements are shown in Tables 1 and 2.

Sliding Property:

A resistance value when the sliding stopper was moved in an injection cylinder was measured by means of an autograph (DCS-100 -commercial name- made by Shimazu Seisakujo Co.) to obtain results shown in Tables 1 and 2.

TABLE 1

|  | Modified Polysiloxanes and Comparative Material | Additives Jointly Used | Bridging and Bonding Conditions | | Peeling Quantity (1) (Number) | Sliding Value (2) (kg) |
| --- | --- | --- | --- | --- | --- | --- |
| Example 1 | A-1 | no | light (3) | 30 sec. | 30 | 0.8–1.1 |
| Example 2 | A-1 | 4,4'-bisdimethyl-aminobenzophenone (4) | " | 10 sec | 28 | 0.5–0.8 |
| Example 3 | A-1 | C-1 | " | 10 sec | 8 | 0.2–0.3 |
| Example 4 | A-4 | no | " | 40 sec | 45 | 0.6–0.9 |
| Example 5 | A-4 | B-3 | " | 40 sec | 40 | 0.7–1.0 |
| Example 6 | A-4 | C-2 | " | 30 sec | 21 | 0.2–0.3 |
| Example 7 | A-4 | C-3 | " | 10 sec | 10 | 0.2–0.4 |
| Example 8 | B-3 | C-4 | " | 6 sec | 6 | 0.1–0.3 |
| Example 9 | D-1 | no | " | 15 sec | 12 | 0.4–1.0 |
| Example 10 | A-12 | no | heat 90° C. | 4 hr | 12 | 0.8–1.0 |
| Comparative Example 1 | no | no | no | | 60 | 3–5 |
| Comparative Example 2 | silicone oil (5) | no | no | | 680 | 0.1–0.2 |
| Comparative Example 3 | silicone rubber (6) | no | no | | 230 | 3–5 |
| Comparative Example 4 | silicone rubber (7) | no | heat 170° C. | 15 min | 80 | 3–4 |
| Comparative Example 5 | RTV silicone rubber (8) | no | heat 100° C. | 3 min | 110 | 2.5–4 |
| Comparative Example 6 | silane coupling agent (9) | no | heat 100° C. | 3 min | 120 | 2.5–3.5 |
| Comparative Example 7 | A-16   10 | no | light | 40 sec | 55 | 2–3 |
| Comparative Example 8 | A-16 | 4,4'-bisdimethyl-aminobenzophenone | " | 20 sec | 37 | 1–2.5 |
| Comparative Example 9 | A-17   11 | — | " | 30 sec | 48 | 1–1.5 |
| Comparative Example 10 | A-17 | 4-trimethylsilyl-benzophenone:5 phr | " | 10 sec | 32 | 1–1.2 |

Notes of Table 1
(1): Quantity of fine particles, number of particles of 10 $\mu$m in diameter ($\pm$3 particles)
(2): Diameter of sliding stopper 15.3 mm, sliding height 7.7 mm having uneven surface shown in FIG. 2. Measurement is represented by a resistance value (kg) when an injection cylinder is fixed and the sliding stopper is moved.
(3): Ultraviolet rays 250–450 $\mu$m, efficiency 10%
(4): Optimum absorption wavelength range 360 nm. 10 parts of 1.2 methanol solution added, Nissocure -commercial name- made by Shinnisso Kako Co.
(5): Methyl silicone oil, TSF 451 -commercial name- made by Toshiba Silicone Co., 1.2% isopropyl alcohol solution
(6): 1.2% isopropyl alcohol solution, KE 530-U -commercial name- made by Shinetsu Silicone Co (vinyl content about 0.3 mol %)
(7): KE 530-U is mixed with 1 part of di-t-butyl peroxide as a bridging agent by rubber rolls and used in the form of a 1.2% isopropyl alcohol solution.
(8): 1.2% isopropyl alcohol solution, KE 42 RTV -commercial name- made by Shinetsu Silicone Co., containing about 0.5 mol % of acetic acid (deacetylated type)
(9): $\gamma$-Methacrylopropylmethoxysilane is used in the form of a 1.2% isopropyl alcohol solution.
(10): Methacryl content 5.4 mol % in molecule, further containing hydroxyl groups
(11): Methacryloxy content 3 mol % in composition As can be seen from the results of Table 1, the sliding values in Examples 1, 4, 8, 9 and 10 wherein acryloyl group (A), maleimide group (B) and vinyloxy group (D) modified polysiloxanes are coated are less than that in Comparative Examples 3, 4, 5, 7 and 9 wherein silicone rubbers are coated. The silicone oil (Comparative Example 2) exhibits a less sliding value, but a higher peeling quantity which is not suitable. As to the bridging method, the light treatment can be accomplished in a shorter time than the heat treatment. In particular, the combination of the acryloyl group- and maleimide group-modified organopolysiloxane and the initiator containing phenylketone group (Example 2) is preferable and more particularly, the use of the addition products to siloxanes as the initiator is more preferable because of better compatibility with the modified polysiloxanes (Examples 6, 7 and 8). Comparative Examples 6, 7, 8, 9 and 10 wherein the reactive groups in larger proportions of mol % are introduced into the modified polysiloxanes exhibits higher sliding values and are not preferred.

bridging and bonding the polysiloxane and forming the coating layer.

TABLE 2

| Example No. | Modified Polysiloxane No. | Peeling Quantity of Polysiloxane* (No.) | Sliding Property (kg) | Example No. | Modified Polysiloxane No. | Peeling Quantity of Polysiloxane* (No.) | Sliding Value (kg) |
| --- | --- | --- | --- | --- | --- | --- | --- |
| Example 11 | A-2 | 18 | 0.5-0.7 | Example 21 | A-13 | 21 | 0.3-0.5 |
| Example 12 | A-3 | 20 | 0.4-0.6 | Example 22 | A-14 | 19 | 0.4-0.6 |
| Example 13 | A-5 | 18 | 0.6-0.8 | Example 23 | A-15 | 15 | 0.6-0.8 |
| Example 14 | A-6 | 21 | 0.4-0.7 | Example 24 | B-1 | 20 | 0.6-0.8 |
| Example 15 | A-7 | 19 | 0.5-0.7 | Example 25 | B-2 | 19 | 0.4-0.6 |
| Example 16 | A-8 | 22 | 0.7-0.8 | Example 26 | C-1 | 24 | 0.3-0.5 |
| Example 17 | A-9 | 19 | 0.5-0.7 | Example 27 | C-5 | 20 | 0.5-0.7 |
| Example 18 | A-10 | 23 | 0.6-0.8 | Example 28 | C-6 | 23 | 0.6-0.8 |
| Example 19 | A-11 | 18 | 0.4-0.6 | Comparative Example 11 | silicone oil | 800 | 0.1-0.3 |
| Example 20 | A-12 | 20 | 0.3-0.5 | Comparative Example 12 | silicone rubber | 110 | 5-8 |

Note: *±3 particles

As shown in Table 2, the rubber products using the modified polysiloxane according to the present invention (Examples 11 to 28) exhibit less peeling quantities and sliding values as compared with those of Comparative Examples 11 and 12 and are apparently more excellent as sanitary rubber articles.

EXAMPLES 29 TO 34 AND COMPARATIVE EXAMPLES 13 TO 15 a) Rubber Compound and Molding

| | |
| --- | --- |
| BR (JSR BR 01 -commercial name- made by Japan Synthetic Rubber Co.) | 100 |
| Titanium Oxide | 15 |
| Zinc Oxide (No. 1 Grade) | 1 |
| 2,5-dimethyl-2,5-di(t-butylperoxy)-hexane | 1 |

Figure 3:
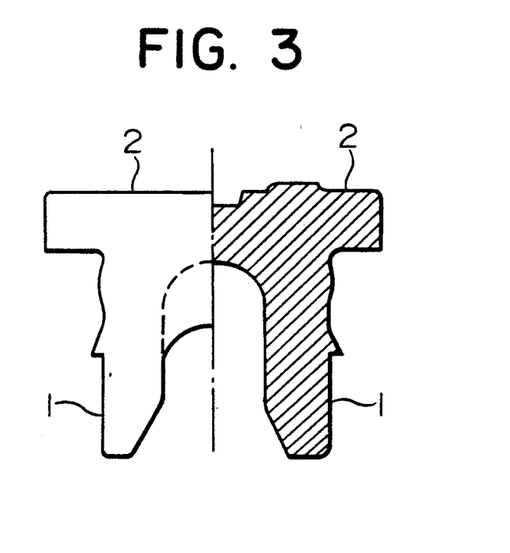
FIG. 3 is a cross-sectional view of a further embodiment of a medical rubber stopper (rubber stopper for lyophilized medication) according to the present invention.

The above described rubber composition was kneaded using rolls according to SRIS 3602 (1972) and then subjected to bridging and molding at a temperature of 170° C. for 10 minutes to prepare a rubber stopper as shown in FIG. 3 and a sliding stopper or plug for an injector (diameter 15.3 mm, length 7.7 mm, hereinafter referred to as "sliding stopper").

b) Coating Rubber Surface with Polysiloxane

Coating solutions of the modified polysiloxanes having the compositions shown in Table 3 according to the present invention (Examples 29 to 34), silicone oils of the prior art for comparison (Comparative Examples 13 and 14) and silicone rubber of the prior art for comparison (Comparative Example 15) were prepared in the form of a 0.1% toluene solution. These coating solutions were sprayed uniformly on the leg part 1 of the rubber stopper shown in FIG. 3 two times and on the cap part 2 one time. The sliding stopper shown in FIG. 4, having a sliding part 3 in an injector cylinder, was wholly immersed in the coating solutions for 1 second and then pulled up. Both of them were heated and dried at 60° to 80° C. in an oven of hot air circulation type to form coatings each having a thickness of about 1 μm.

c) Formation of Coating by Bridging and Bonding

The thus coated rubber stopper and sliding stopper or plug were passed three times through a distance of 5 to 10 cm under a fluorescent lamp with a wavelength of 200 to 500 μm (output 4 W, calcium halophosphate) and thus irradiated uniformly for about 10 seconds, thereby d) Estimation Test The rubber articles of the present invention, obtained as described above, and the comparative articles were subjected to esimation tests described below. The results are shown in Table 4.

(i) Peeling Quantity of Polysiloxane from Rubber Surface

The similar procedure to the estimation test of Examples 1 to 28 was carried out.

(ii) Sliding Property

Figure 4:
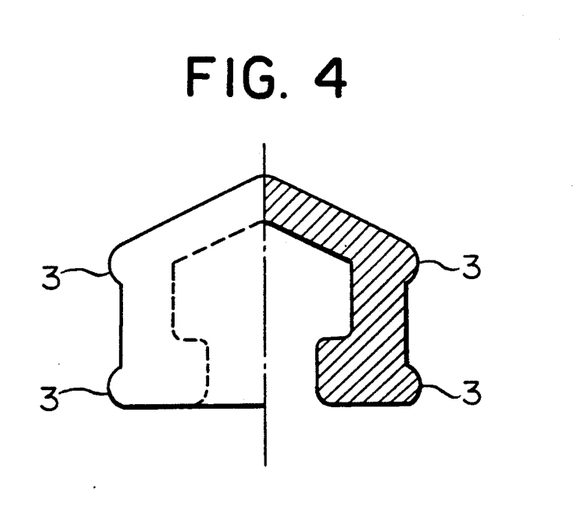
FIG. 4 is a cross-sectional view of a still further embodiment of a sealing and sliding stopper for an injector according to the present invention.

The similar procedure to Examples 1 to 28 was carried out. A sliding stopper having a shape as shown in FIG. 4 but having a rubber surface, not treated, needed a resistance force of 5 to 8 kg.

(iii) Bonding Test of Polysiloxane 100 ml of chloroform was added to 5 rubber stoppers and shaked for about 5 minutes. The quantity of silicon in the thus extracted polysiloxane was measured by an atomic absorption spectrometry method to calculate the quantity of the polysiloxane (μg) from the calibration curve.

(iv) Elution Test

According to "Test Method of Rubber Stopper for Liquid Transfusion" of 11th Revision, Japanese Pharmacopoeia, a rubber stopper was heated in purified water in an amount of 10 times at a temperature of 121° C. for 60 minutes and then subjected to the elution test. The results are shown in Table 4 with the standard values.

e) Test Results

In Examples 29 to 34 according to the present invention, the modified polysiloxanes were adhered, bridged and bonded strongly to the surfaces of the rubber stoppers or sliding rubber stoppers, whereby occurrence of fine particles due to peeling of the polysiloxanes were few even through shaking in water and movement of the sliding stoppers could readily be operated, as shown in Table 4. These results teach that the present invention can prevent to a greater extent peeling of the modified polysiloxanes to form fine particles and contaminate medicaments as foreign matters.

On the other hand, in the case of the silicone oil (Comparative Example 13), it readily peeled to be form fine particles in water and in the case of the silicone rubber (Comparative Example 15), the peeling quantity was small but the sliding value was so large that it was difficult to handle the rubber stopper and it was impossible to put the sliding stopper into practical use unless the surface thereof was coated with a silicone oil.

In Examples 29 to 31, the quantity of fine particles was increased if the irradiation quantity of ultraviolet rays was decreased to 3 seconds although not shown in Table 4. Therefore, it is apparent that a suitable irradiation quantity of ultraviolet rays is effective for the bridging and bonding.

manner to Examples 29 to 34, the coating being carried out similarly to Examples 29 to 34, dried and then bridged and bonded under processing conditions as shown in Table 6 to form coatings.

The thus obtained coated rubber stoppers and sliding stoppers (Examples 35 to 41) and coating-free rubber stopper and sliding stopper for comparison (Comparative Example 16) were subjected to measurement of the

TABLE 3

| | (parts by weight) | | | | | | | | |
|---|---|---|---|---|---|---|---|---|---|
| | Example | | | | | | Comparative Example | | |
| | 29 | 30 | 31 | 32 | 33 | 34 | 13 | 14 | 15 |
| Dimethylpolysiloxane ① | 100 | 100 | 100 | 100 | 100 | 100 | 100 | 100 | — |
| Methylvinylpolysiloxane ② | 10 | 50 | 25 | — | 40 | 40 | — | — | — |
| Methylhydropolysiloxane ③ | — | — | 25 | 10 | — | — | — | — | — |
| Methylhydroxypolysiloxane ④ | — | — | — | 40 | 10 | 10 | — | — | — |
| Methylvinylpolysiloxane ⑤ | — | — | — | — | — | — | — | — | 100 |
| Benzoin Ethyl Ether ⑥ | 0.3 | 0.3 | 0.3 | 0.3 | 0.3 | — | — | 0.3 | 0.3 |
| Disobutyl Peroxide ⑦ | 0.8 | 0.8 | 0.8 | 0.8 | 0.8 | 0.8 | — | 0.8 | 0.8 |

Notes to Table 3
①: linear, polymerization degree n = about 120, volatile components 0.001%/100° C., viscosity 1,000 cps (25° C.)
②: linear, n = about 120, volatile components 0.01%/100° C., vinyl group content 0.15 mol %, viscosity 10,000 cps
③: linear, n = aobut 120, volatile components 0.1%/100° C., hydrogen group content 0.2 mol %, viscosity 500 cps
④: linear, n = about 120, volatile components 0.5%/100° C., hydroxyl group content about 0.2 mol %, viscosity 8,000 cps
⑤: raw material with a vinyl group content of 6 mol %, substantially similar to ②.

⑥: Seikol BEE -commercial name- made by Seiko Kagaku Co., m.p. 58-60° C.
⑦: Paroil 1B -commercial name- made by Nippon Yushi Co.

TABLE 4

| | Example | | | | | | Comparative Example | | | Standard of Japanese |
|---|---|---|---|---|---|---|---|---|---|---|
| | 29 | 30 | 31 | 32 | 33 | 34 | 13 | 14 | 15 | pharmacopoeia |
| Peeling Quantity of Polysiloxanes (number) | 41 | 23 | 18 | 20 | 10 | 14 | 580 | 550 | 20 | |
| Sliding Value (kg) | 0.1–0.3 | 0.2–0.4 | 0.3–0.5 | 0.2–0.5 | 0.1–0.3 | 0.2–0.4 | 0.1–0.2 | 0.1–0.3 | 5–7 | |
| Quantity of Siloxane Adhered ($\mu$g) | 650 | 510 | 410 | 480 | 380 | 430 | 1000 | 940 | 320 | |
| Elution Materials | | | | | | | | | | |
| Property (Permeability %) | 99.9 | >99.9 | >99.9 | >99.9 | >99.9 | >99.9 | 99.5 | 99.8 | 99.8 | >99.0% at wavelength 430 $\mu$m |
| Foaming (min) | <1 | <1 | <1 | <1 | <1 | <1 | 3 | 2 | 2 | foam disappearing within 3 min |
| pH | 0.4 | 0.3 | 0.3 | 0.3 | 0.3 | 0.3 | 0.6 | 0.5 | 0.4 | difference from blank less than 1.0 |
| Zinc ($\mu$g/ml) | <0.1 | <0.1 | <0.1 | <0.1 | <0.1 | <0.1 | 2 | 1 | 1 | <1 |
| KMnO$_4$ Reducing Material (ml) | <0.1 | <0.1 | <0.1 | <0.1 | <0.1 | <0.1 | 0.5 | 0.4 | 0.4 | difference from consumption <2.0 |
| Evaporation Residue (mg) | 0.3 | <0.2 | <0.2 | <0.2 | <0.2 | 0.2 | 3.2 | 2.8 | 0.5 | <2.0 |
| UV Absorption (absorbance) Spectrum | <0.05 | <0.05 | <0.05 | <0.05 | <0.05 | <0.05 | 0.2 | 0.2 | 0.1 | <0.2 at wavelength of 220–350 |

EXAMPLES 35 TO 41 AND COMPARATIVE EXAMPLE 16

Bridging agents or sensitizers as shown in Table 5 were added in proportions as shown in Table 5 to 100 g of a polydimethylsiloxane consisting of 3 mol % of methylvinylsiloxane units and the balance of dimethylsiloxane units, both the terminals of the molecular chains being blocked with trimethylsilyl groups, and having a viscosity of 2,000 cps at 25° C. and uniformly mixed, to which a mixed solution of toluene and isopropyl alcohol (1:1) was added to prepare a 0.3% solution. The thus resulting solution was coated onto rubber stoppers and sliding stoppers prepared in the similar peeling quantity and sliding value in an analogous manner to Example 29, the peeling quantity being of rubber fine particles in the case of Comparative Example 16, thus obtaining results shown in Table 6.

It will clearly be understood from the results of Table 6 that in Examples 35 to 41, the processing can be accomplished under relatively simple conditions in a shorter time to obtain products with smaller peeling quantities of the polysiloxanes, more excellent sanitary properties, smaller sliding values, i.e. less adhesiveness and larger readiness of handling, although the products of Examples 35 and 36 are somewhat inferior in properties, while in Comparative Example 16, the coating-free product exhibits a very larger sliding value and larger peeling quantity of fine particles from the surface of the rubber.

Since a sliding stopper or plug consisting of only rubber has a large sliding value, an injector comprising an injection cylinder and a sliding stopper of rubber is generally available, the inner surface of the former and the surface of the latter being coated with a silicone oil. In this case, the regulation on the weight of trifluorotrichloroethane soluble materials is applied according to Notification No. 442 of the Welfare Ministry.

TABLE 5

|  | Example | | | | | | | Comparative Example |
|---|---|---|---|---|---|---|---|---|
|  | 35 | 36 | 37 | 38 | 39 | 40 | 41 | 16 |
| Dicumyl Peroxide ① | 2 | — | — | — | — | — | — | — |
| t-Butylperoxybenzoate ② | — | 2 | — | — | — | — | — | — |
| 3-Benzoylperoxy-3-methyl-butyltriethylsilane | — | — | 1 | — | — | — | — | — |
| 3,3'-Dimethyl-4-ethoxy-benzophenone | — | — | — | 1 | — | — | — | — |
| Pertrimellitic Acid Tri-t-butyl Ester | — | — | — | — | 1 | — | — | — |
| 2,5-Dimethyl-2,5-di(3-methylbenzoyl-peroxy)hexane | — | — | — | — | — | 1 | — | — |
| 3,3',4,4'-Tetra-(t-butylperoxy-carbonyl)benzo-phenone | — | — | — | — | — | — | 1 | — |

Note:
① Percumyl D (commercial name, made by Nippon Yushi Co.)
② Perbutyl Z (commercial name, made by Nippon Yushi Co.)

TABLE 6

|  | Example | | | | | | | Comparative Example |
|---|---|---|---|---|---|---|---|---|
|  | 35 | 36 | 37 | 38 | 39 | 40 | 41 | 16 |
| Processing Conditions |  |  |  |  |  |  |  |  |
| Heating 110° C. × (min) | 120 | 1 | — | — | 0.3 | 0.1 | — | — |
| Fluorescent Lamp Irradiation Time (sec) | 30 | 10 | 10 | 10 | — | 5 | 10 | — |
| Peeling Quantity of Polysiloxanes (number) | 230 | 96 | 14 | 25 | 28 | 16 | 12 | 200 |
| Sliding Value (kg) | 0.3–0.6 | 0.2–0.5 | 0.1–0.2 | 0.2–0.4 | 0.3–0.5 | 0.2–0.4 | 0.1–0.7 | 6–8 |

EXAMPLES 42 TO 48 AND COMPARATIVE EXAMPLES 17 AND 18

| Rubber Composition | parts by weight |
|---|---|
| IIR (JSR Butyl 365 -commercial name- made by Nippon Butyl Co.) | 100 |
| Zinc Oxide | 2 |
| Stearic Acid | 1 |
| Clay (Burgess Iceberg -commercial name- made by Burgess Pigments Co.) | 60 |
| Processing Aid (HI-WAX No. 110 P -commercial name- made by Mitsui Sekiyu Kagaku Co.) | 1.5 |
| Magnesium Oxide (Kyowamagu 100 -commercial name- made by Kyowa Chemical Industry Co.) | 3 |
| White Carbon (Carplex 1120 -commercial name- made by Shionogi Seiyaku Co.) | 10 |
| Titanium Oxide | 5 |
| Sulfur | 0.8 |
| Zinc Di-n-butyldithiocarbamate | 0.7 |

| Rubber Composition | parts by weight |
|---|---|
| Zinc Diethyldithiocarbamate | 0.7 |

The above described rubber composition was kneaded using two rolls according to a test method described in SRIS 3603 (1979) and subjected to bridging and molding at a temperature of 150° C. for 30 minutes to prepare a rubber stopper as shown in FIG. 3 and a sliding plug for an injector as shown in FIG. 4. The thus molded articles were immersed for 2 seconds in 0.3% solutions of modified polysiloxane compositions shown in Table 7 diluted with a mixed solution of isopropyl alcohol and ethyl ether (1:1), pulled up, dried to form coated layers and then bridged and bonded in the similar manner to Examples 29 to 34 to form coatings. The thus coated rubber stoppers and sliding stoppers (Examples 42 to 48 and Comparative Examples 17 and 18) were subjected to measurement of the peeling quantity of polysiloxanes and sliding value, thus obtaining results as shown in Table 7.

As is evident from the results of Table 7, in Examples 42, 46 and 48 wherein the bridging and bonding are carried out by irradiation of ultraviolet rays, the coatings are strongly bonded to the rubber surfaces so that they are hardly peeled, while in Examples 43, 44, 45 and 47 wherein the bridging and bonding are carried out by heating, there arises a problem that the processing time is somewhat longer. In Comparative Examples 17 and 18, on the other hand, the coated rubber articles emit an offensive odor because the polysiloxane contains sulfur and are not suitable, or after the passage of about 2 months, the coated rubber articles exhibit a large change in the sliding value, i.e. 0.6 to 1.0 kg.

Polysiloxane compositions ① to ⑨ shown in Table 7 are as follows:

①: 100 g of $$-\underset{\underset{CH_3}{|}}{\overset{\overset{CH_3}{|}}{Si}}-O-(CH_3)_2-CH=CH_2 \text{ (viscosity 1,200 cps)}$$

and 1.5 g of

-continued (total amount of group X: about 4 mol %)

②: uniform mixture of 100 g of a polydimethylsiloxane with a viscosity of 1,300 cps, both the terminals being blocked with dimethylvinylsilyl groups, 5 g of a polyorganosiloxane consisting of 43 mol % of $(CH_3)_3SiO_{\frac{1}{2}}$ units, 50 mol % of $SiO_2$ units and 5 mol % of $(CH_2=CH)(CH_3)\cdot SiO$ units, 5 g of a polymethylhydrogensiloxane with a viscosity of 100 cps, both the terminals being blocked with trimethylsilyl groups and 2 g of butenyltriacetylsilane

③: $H_2N(CH_2)_3\!-\!\!\begin{bmatrix}CH_3\\|\\SiO\\|\\CH_3\end{bmatrix}_{\overline{18}}\!\!\begin{matrix}CH_3\\|\\SiO\\|\\CH_3\end{matrix}\!\!-\!(CH_2)_3\!-\!NH_2$  1.2 g 40 g (group X=about 1 mol %)

④  $CH_2=CH\!-\!\!\begin{matrix}CH_3\\|\\SiO\\|\\CH_3\end{matrix}\!\!\!\begin{bmatrix}CH_3\\|\\SiO\\|\\CH_3\end{bmatrix}_{\overline{195}}\!\!-$ viscosity 800 cps 100 g -continued $(CH_3)_3\!-\!SiO\!\!\begin{bmatrix}CH_3\\|\\SiO\\|\\H\end{bmatrix}_{\overline{18}}\!\!\begin{bmatrix}CH_3\\|\\SiO\\|\\CH_3\end{bmatrix}_{\overline{16}}\!Si(CH_3)_3$  1.5 g (group X=1 mol %)

⑤: 100 g of both terminal ethoxy-methyl-γ-trichlorovinylpolysiloxane (n=32) and 32 g of both terminal hydroxyallyl-methylpolysiloxane (vinyl group content=0.15 mol %)

⑥: 100 g of an organopolysiloxane consisting of 0.2 mol % of $(CH_3)\cdot(CH_2=CH)SiO$ units and 99.8 mol % of $(CH_3)_2\text{-}SiO$ units and having a viscosity of 530 cps and 13 g of a dimethylpolysiloxane having hydroxyl groups at both the terminals (n=180)

⑦: 100 g of a copolymer of dimethylsiloxane and methylvinylpolysiloxane, both the terminals being blocked with dimethylvinylsilyl groups (vinyl group content=0.18 mol %, viscosity 300 cps), 8 g of a copolymer of dimethylsiloxane and methylhydrogensiloxane, both the terminals being blocked with trimethylsilyl groups (mole ratio of silicon atom-bonded hydrogen atoms and methyl groups=1/30, viscosity 20 cps) and 0.1 g of 4'-isopropyl-2-hydroxy-2-methylpropiophenone ⑧: 95 g of a methylphenylvinylsiloxane oily material consisting of 97 mol % of dimethylsiloxane units and 3 mol % of diphenylsiloxane units, both the terminals being blocked with divinylmethylsilyl groups and 8 g of a mercaptoalkyl group-containing organopolysiloxane consisting of 5 mol % of mercaptopropyl(methyl)siloxane units and 50 mol % of dimethylsiloxane units ⑨ $HO\!-\!\!\begin{bmatrix}CH_3\\|\\Si\!-\!O\\|\\CH_3\end{bmatrix}_{about\ 740}\!\!-\!(CH_2)_3\!-\!O.CO.CH=CH_2$  100 g

TABLE 7

| | Example | | | | | | | Comparative Example | |
|---|---|---|---|---|---|---|---|---|---|
| | 42 | 43 | 44 | 45 | 46 | 47 | 48 | 17 | 18 |
| Modified Polysiloxane Composition | ① | ② | ③ | ④ | ⑤ | ⑥ | ⑦ | ⑧ | ⑨ |
| Additives (g) | benzoin ethyl ether 1 | disobutyl peroxide 1 | — | — | 3,3'-dimethyl 4-ethoxybenzophenone 1 | 2,5-dimethyl 2,5-di(t-butylperoxy) hexane 0.2 | Benzyl dimethyl ketanol 0.2 | benzoin ethyl ether 2 | benzoin ethyl ether 1 |
| Bridging Condition | | | | | | | | | |
| Heat | — | 30° C. 10 min | 60° C. 60 min | 60° C. 120 min | — | 100° C. 2 min | — | — | — |
| Irradiation | UV 25 | — | — | — | UV 5 sec | — | UV 5 sec | UV 10 sec | UV 15 sec |
| Peeling Quantity of Polysiloxane (No.) | 24 ± 2 | 36 ± 2 | 42 ± 3 | 53 ± 4 | 41 ± 3 | 38 ± 2 | 28 ± 3 | 120 ± 5 | 31 ± 3 |
| Sliding Value (kg) | 0.3–0.6 | 0.4–0.7 | 0.5–0.7 | 0.6–0.8 | 0.4–0.7 | 0.4–0.7 | 0.3–0.6 | 1.2–1.5 | 0.4–0.7 |

What is claimed is:

1. A process for the production of a modified polysiloxane-coated sanitary rubber article, which comprises applying to a rubber surface a modified polysiloxane composition comprising a modified polysiloxane having at least one group selected from the group consisting of alkenyl, acryloyl, vinyloxy, maleimide and phenylketone groups in the molecule, and bridging the modified polysiloxane by irradiation of an electron beam, a laser beam or ultraviolet rays to form a coating strongly bonded to the rubber surface.

2. The process as claimed in claim 1, wherein the modified polysiloxane has a molecular weight of 2,000 to 5,000,000 and is coated with a solvent onto a rubber surface, dried to remove the solvent and then subjected to the bridging and bonding treatment.

3. The process as claimed in claim 1, wherein the modified polysiloxane composition is a mixture or condensate of the modified polysiloxane with an organopolysiloxane having at least one group selected from the group consisting of vinyl, hydroxyl, hydrogen, acetyl, acetoxy, epoxy, ester, ether, alkenyl, alkoxy, amino and mercapto groups in the molecule.

4. The process as claimed in claim 1, wherein the modified polysiloxane composition contains at least one member selected from the group consisting of sensitizers and bridging agents.

5. The process as claimed in claim 1, wherein the modified polysiloxane has a viscosity of at most 30,000 cps.

6. The process as claimed in claim 1, wherein the modified composition is applied in the form of a diluted solution with a solvent to give a concentration of 0.001 to 3% by weight of the modified polysiloxane.

7. The process as claimed in claim 1, wherein the coating has a thickness of 0.1 to 50 μm.

8. The process as claimed in claim 1, wherein the modified polysiloxane is represented by the general formula, in which $R_1$ is a non-substituted or fluorine-substituted alkyl group having 1 to 7 carbon atoms, phenyl group or phenylalkyl group, $R_2$ is an alkyl group having 1 to 4 carbon atoms and X is an alkenyl group or at least one group selected from the group consisting of hydrogen, hydroxyl, epoxy, acetoxy, acetyl, $C_1$ to $C_3$ alkoxy and amino groups, which is bonded to the silicon atom directly or through an alkylene group, and n and m are integers and satisfy $1 \leq n \leq 40$ and $20 \leq n+m \leq 70,000$.

* * * * *